United States Patent [19]
Ertle et al.

[11] Patent Number: 5,612,386
[45] Date of Patent: Mar. 18, 1997

[54] BLOWING AGENT FOR THERMOPLASTIC AND THERMOSET POLYMERS

[75] Inventors: Raymond T. Ertle; Raymond J. Ertle, both of Pompton Plains, N.J.

[73] Assignee: Cylatec, Inc., Canton, Ohio

[21] Appl. No.: 392,466

[22] Filed: Feb. 22, 1995

Related U.S. Application Data

[63] Continuation-in-part of Ser. No. 123,431, Sep. 17, 1993.

[51] Int. Cl.$^6$ .......................................................... C08J 9/12
[52] U.S. Cl. ................................ 521/91; 521/94; 521/122
[58] Field of Search ................................ 521/122, 91, 94

[56] References Cited

U.S. PATENT DOCUMENTS

| | | |
|---|---|---|
| 2,911,382 | 11/1959 | Barkhoff . |
| 3,511,787 | 5/1970 | Bertorelli et al. . |
| 3,743,605 | 7/1973 | La Clair . |
| 4,029,612 | 6/1977 | Collington . |
| 4,097,423 | 6/1978 | Dietrich . |
| 4,266,038 | 5/1981 | DiGiulio et al. . |
| 4,278,768 | 7/1981 | DiGiulio et al. . |
| 4,286,070 | 8/1981 | DiGiulio et al. . |
| 4,521,333 | 6/1985 | Graham et al. . |
| 4,686,244 | 8/1987 | Dietlein et al. . |
| 4,719,249 | 1/1988 | Dietlein et al. . |
| 5,246,654 | 9/1993 | Ertle et al. . |
| 5,369,147 | 11/1994 | Mushovic . |

FOREIGN PATENT DOCUMENTS 844652   6/1970   Canada .

*Primary Examiner*—Morton Foelak
*Attorney, Agent, or Firm*—Klauber & Jackson

[57] ABSTRACT

Improved blowing agents for thermoplastic and thermoset polymers are disclosed which contain silicate based compounds containing from about 5 to about 40% water and which expand or intumesce when heated to at least about 5 times their initial volume, which blowing agents are highly effective, predictable, stable and microwave receptive, do not cause post-blow, and which also act as an initiator or accelerator for other organic blowing agents.

12 Claims, No Drawings

BLOWING AGENT FOR THERMOPLASTIC AND THERMOSET POLYMERS

RELATED APPLICATIONS

This application is a continuation-in-part of U.S. application Ser. No. 08/123,431 filed Sep. 17, 1993.

BACKGROUND OF THE INVENTION

It is well known in the an to employ blowing or foaming agents to lighten thermally processed polymers (TPPs) such as thermoplastic resins, thermoset resins and thermoset elastomeric compounds.

It is advantageous to employ these blowing agents with TPPs when lighter parts are desired, or when other properties, such as compressibility or greater flexibility as in the case of an automotive weather stripping, are desired. These blowing agents are added to the feed at the beginning of or during the process cycle and perform their designed function by decomposing under the temperature conditions employed during thermal processing thereby producing a gas as a by-product of this decomposition. Bubbles of gas thus formed are entrained within the TPP, and when the TPP cures or hardens, the bubbles become fixed in the pan produced.

Lower cost bicarbonates which generate $CO_2$ are employed as blowing agents, but the results achieved during their thermal decomposition are relatively unpredictable, and therefore they are not usually employed to produce high quality parts. The more predictable azodicarbonamides (azides) or similar organic compounds are more commonly used. During the thermal decomposition of these azides, nitrogen gas, along with lesser amounts of other gases, is produced.

Although considered effective, azides, in actual practice, are relatively poor performers in that only a portion of the nitrogen gas produced by the compound is actually employed in blowing or expanding the TPP. This is due to the fact that gas capture in the TPP only occurs during a specific time interval in the processing operation.

In the case of a thermoset, the TPP will only capture and hold gas bubbles during a relatively short interval in its processing. It only begins to capture gas when it has cured sufficiently to yield the necessary film strength and viscosity required for gas capture, and it stops capturing gas when its film strength and viscosity exceed a limit wherein the cells rupture and no longer can take advantage of additional gas generation. Unfortunately, the short interval during which gas capture is possible is only a fraction of the interval during which azides actually generate gas. Thus the portion of gas actually captured is only a portion of the total of the nitrogen gas actually produced by the azide. In an attempt to overcome this inefficiency, azide accelerators such as triethanolamine, zinc stearate, lead stearate, barium stearate, calcium stearate, zinc oxide and dibasic lead phthalate are often employed. These accelerators can lower the temperature at which azides begin to decompose, but the inefficient relationship between the gas capture interval and the gas evolution interval still exists, and the addition of heavy metals is undesirable.

This inefficiency of azides causes many problems. Blown compounds cost more to produce because azides have to be overused to achieve a specific density in the finished part or sheet. Also some of the unblown azide in the finished part may eventually gas off, causing post-blow problems such as the surface blistering of painted parts, and objectional odors in the part or sheet at the consumer level. Post-blow is also a problem if a TPP containing unreacted azide is recycled, in that the azide may decompose during the recycling process.

Additionally, compounded materials containing azides have a limited shelf life between the time they are mixed and the time they are thermally blown. This shelf life may be as short as or shorter than 24 hours, and batches exceeding shelf life must be discarded or reworked.

Another problem caused by the use of azides is the fact that some of the azide decomposition products which remain in the material being blown are potentially reactive, and can, over time, react with, and subsequently degrade the material of the finished parts in which they are contained. This effect is greatly accelerated when the parts are normally subjected to high temperature conditions during their normal lifetime. Additionally, when processing azide blown TPPs in a heated screw extruder, cyanuric acid, an azide by-product, tends to plate out on the unit's internal surfaces, causing production problems as well as corrosion problems.

Another significant problem encountered with azide s in the blowing of thermo set elastomers is the great difficulty with which thick parts are produced. The blowing of thermoset elastomers with azides involves both the generation of blowing gas through thermal decomposition of the azide as well as the curing of the compound by heat. To effectively produce a blown part, gas generation must occur during that portion of the curing cycle in which the compound viscosity and film strength are high enough to trap gas bubbles, yet not so high as to inhibit blowing or to cause rupture of the individual cells. Proper selection of azide and compound cure rate will allow the production of blown parts of relatively narrow thicknesses by heat treatment in an oven, heated mold or molten salt bath. When a thicker part is desired, however, a major problem is encountered when the part is heated wherein the outermost layers of the part reach reaction temperatures before the interior layers, and these outer layers tend to blow and cure, hindering the conduction of heat to the interior of the part, and also inhibiting the blowing of the interior of the part due to the formation of the cured, less pliable outer skin. Because azides are not microwave receptive, their thermal decomposition can only be accomplished through the aforementioned conduction of heat from the outer surfaces to the inner portions of the part, thereby causing difficulty in the production of thick parts.

Azides also tend to discolor light colored TPPs, and overuse tends to exaggerate this problem. The most significant problem with azides, however, may be the potential for the creation of nitrosamines when azides are used as a blowing agent. Azide overuse increases this potential nitrosamine formation.

U.S. Pat. No 4,029,612 discloses azodicarbonamide blowing agents containing silica which prevent plate-out onto machine parts of cyanuric acid which forms as a result of azide decomposition, which silica also provides 1.5 to 20 parts of water to 100 parts by weight azodicarbonamide. Additional water may be added to the composition by adding other compounds containing available water as long as no more than a total of 20 parts of water per 100 parts of azodicarbonamide are present, and these compounds may consist of silicates, oxides, chlorides, carbonates, sulfates, hydroxides, tanrates, phosphates, benzoates, borates and oxalates. The purpose of the additional water which may be added through the use of these compounds is to prevent cyanuric acid plate-out. U.S. Pat. Nos. 4,286,070, 4,278,768 and 4,266,038 and Canadian Patent No. 844652 describe the use of water or of hydrated salts as blowing compounds, including the highly alkaline sodium metasilicate pentahydrate. These blowing compounds are limited to use in narrowly defined specific polymers or combinations of these polymers and lower alkalinity alkali metal silicates which intumesce are not discussed. U.S. Pat. No. 2,911,382 also describes the use of hydrated compounds which must be used in conjunction with organic liquid blowing agents such as acetone or alcohol which serve as blowing agents for narrowly defined polymers. In U.S. Pat. Nos. 4,719,249, 4,686,244, and 4,521,333, fire retardant copolymers are described which contain fillers consisting of hydrated compounds including alkali metal silicates to impart fire resistance. These compounds are basically fire proofing compounds and are designed to function under intense heat and fire conditions at temperatures higher than the thermal decomposition temperature of the polymer base. U.S. Pat. No. 5,369,147 teaches the use of water absorbed into fillers as a blowing agent for narrowly defined polymers. In U.S. Pat. No. 3,511,787 a reactive, phylloidal, high surface area silica containing water is described as an activator/promotor for chemical blowing agents. U.S. Pat. No. 3,743,605 describes the use of compounds including sodium and potassium silicates as inert dispersing agents for blowing agents such as azodicarbonamide, which inert compounds do not decompose to form a gas when the polymer composition in which they are incorporated melts or fuses.

The above described references do not disclose or teach the novel blowing agents of the present invention which are readily distinguishable from those of the prior art.

OBJECTS OF THE INVENTION

In accordance with the foregoing, it may be regarded as an object of the present invention to provide blowing agents for thermally processed polymers which are predictable and stable and have extended batch life, which do not discolor polymers into which they are incorporated, and which are not susceptible to post-blow that may cause recycling problems or finished part post-treatment problems such as paint blistering.

It is a further object of the invention to provide blowing agents that do not contain by-products that can either cause polymer degradation or are prone to plating out on the internal surfaces of processing equipment, and to provide blowing agents which do not have the potential to cause nitrosamine formation in the finished part.

It is still a further object of the invention to provide blowing agents which are microwave receptive, thereby facilitating the production of thick parts.

It is yet a further object of the invention to provide blowing agents which do not require accelerators, and which themselves act as an initiator for azide blowing agents, thereby allowing decreased use of azides while still maintaining blowing performance.

BRIEF SUMMARY OF THE INVENTION

Compositions containing particulate intumescing or expanding alkali metal silicates, which particulates contain between 5 and 40% water, which water is released when the compounds are subjected during normal polymer thermal processing to a temperature greater than 250° F. but below the degradation temperature of the TPP in which they are contained, will serve the purposes of the present invention. These alkali metal silicates have a mole ratio of $SiO_2:M_2O$ of at least 1.5:1, and preferably at least 2.0:1, where M represents an alkali metal or a combination of alkali metals. Alkali metal silicates with ratios of $SiO2:M_2O$ lower than the aforesaid ratio of about 1.5:1 are unreliable blowing agents in that they tend to be very hygroscopic in nature, and thus are prone to having varied water content. Additionally, these lower ratio materials are quite alkaline in nature, and can cause instabilities and unwanted reactions in many TPPs.

Effective silicates for the purposes of the present invention are those which intumesce or expand when heated to at least about 5 times their initial volume, and particularly effective materials are such as described in my U.S. Pat. No. 5,246,654 and my co-pending U.S. application Ser. No. 08/123,432, incorporated herein by reference, and consist of a free-flowing alkali metal silicate-based particulate material. The particles of the particulate have a moisture content of about 5 to 40%. The silicate is the majority non-aqueous component and is present in an amorphous phase.

The blowing compounds of the present invention, being free-flowing, stable and easily handleable, require no special coatings or adjuncts, such as accelerators, for them to perform their intended functions. In employing these compounds, they are simply mixed together with other batch ingredients employing the standard mixing procedures normally required for the particular thermoplastic or thermoset material in which they are incorporated. Due to their exceptional stability, batches may be prepared far in advance of the actual finished processing required without fear of degradation or loss of consistency.

While not wishing to be held to any particular theory, it appears that the unexpected effectiveness of these novel blowing agents when compared to azides lies in the fact that, in actual practice, they produce their blowing gas over a relatively short period of time as compared to azide type blowing agents. Thus, in a thermoset compound, for instance, they allow all of their potential blowing gas to be released during the relatively short interval between the onset of cure, wherein the compound has sufficient viscosity to contain the gas, and the point of cure wherein the compound's viscosity becomes high enough, and its elasticity low enough, to cause rupture of individual cells and subsequent loss of blowing gas.

DETAILED DESCRIPTION

The quantity of these silicate based blowing agents to be incorporated into a TPP will, of course, be determined by the desired specific gravity (SG) of the blown TPP as compared to the SG of the unblown material. In general, for compounds presently being blown with azide, replacing the entirety of the azide with from about one-half to about one-thirtieth the amount of the blowing agents of the present invention will normally produce equivalent reductions in compound SG with appropriate adjustments to processing temperature and cure system, and the removal of any desiccants which may be present in the compound. In actual practice, between about 0.005 to 20 parts silicate based blowing agent will be added to 100 parts of the polymer to be blown, with the preferred range being about 0.05 to 10 parts per 100 parts of polymer.

To insure adequate performance, the particle size of the blowing agents of the present invention should be such that the mean particle size is less than about 45 microns, with the preferred mean particle size being smaller than about 40 microns.

When employed as an initiator or accelerator for azide blowing agents, an amount of the blowing agent of the present invention equivalent to from about 1 pan to about 50 parts based upon 100 parts of the azide contained in the total formulation will be required, with a subsequent lowering of the total amount of blowing agent contained in the formulation to that amount necessary to achieve the desired blown SG of the compound.

EXAMPLE I

A silicate based blowing agent was prepared by combining 2500 parts of alkali metal silicate solution with 50 parts of hydrous magnesium silicate and 100 parts of 20% boric acid solution. The mixture was heated and water was allowed to evaporate until enough water was driven off to yield a solids level in the mixture of 48%. The mixture was subsequently comminuted and further dried such that the comminuted particles had an average moisture content of 20%. These dried particles were subsequently comminuted to yield a particulate, the particles of which passed through a 300 mesh U.S. standard screen.

A master batch was then prepared by adding one pan of this blowing agent to a mixture consisting of 100 parts EPDM rubber, 170 parts $CaCO_3$, 200 parts carbon black and 140 parts naphthalenic oil along with standard EPDM sulfur based curing system components. The complete mixture was then milled to insure homogeneity in the compound and a sample of this compound measuring 1" long by 1" wide by ⅜" thick was subjected to 600 watts of microwave energy for 9 seconds.

Upon examination, the piece was found to have doubled in size. The piece was cut in half along its length, and a visual examination of its cross-section showed an even distribution of relatively uniform cells in the middle of the piece. It was also noted that the blowing had propagated from the center of the piece, as evidenced by the fact that less cells were found toward the outside surfaces of the piece. Thus it was shown that my novel blowing agents heretofore described, unlike azides, can be used to blow thick parts by microwave radiation.

EXAMPLE II

A fresh sample of the master batch described in Example I measuring 2.0"×2.0"×0.10" thick was cured at a temperature of 356° F. for a period of 6 minutes. A portion of this batch having the same dimensions as the first sample was also aged for 75 days at ambient temperature and humidity and was subsequently cured at a temperature of 356° F. for a period of 6 minutes.

Both the fresh cured sample and the aged cured sample were compared, and the aged sample was found to have the same degree of expansion as the fresh sample. Additionally, upon dissection, both samples were found to contain uniform cells of similar size throughout.

EXAMPLE III

To determine the ability of the blowing agents of the present invention to act as an initiator for azide blowing agents, the following formulations were prepared employing a thermoset resin compound consisting of a bisphenol A/epichlorhydrin epoxy resin with an aromatic amine curing system: Formula A consisted of a mixture of 1.5 parts of azodicarbonamide and 98.5 parts of the above described thermoset compound. Formula B was the same as Formula A but also contained 0.1 part of the silicate based blowing agent described in EXAMPLE I.

The samples were individually mixed and poured into identical aluminum molds at which time they were blown and cured at a temperature of 300° F. for 75 seconds. Upon examination, Formula A was found to have approximately doubled in volume, whereas, Formula B was found to have increased more than four times in volume. Thus the initiating effect of the blowing agents of the present invention on azide blowing agents is readily apparent.

EXAMPLE IV

Individual samples were prepared employing various materials as the blowing agent. In each case, 98.5 parts of the thermoset resin compound of Example III were mixed with 1.5 parts of the following hydrated materials to produce the following samples: A) sodium borate pentahydrate, B) magnesium sulfate heptahydrate, C) sodium metasilicate pentahydrate and D) the silicate based blowing agent of Example I. A control E) was also prepared consisting of 98.5 parts of the aforesaid thermoset compound and 1.5 parts azodicarbonamide. All samples were intimately mixed, poured into aluminum molds and were subsequently cured in an oven at 300° F. for 75 seconds.

Upon examination, samples A, B and C were found to have only expanded to approximately one and one-half times their original volume and contained an uneven distribution of cells, many of which had coalesced; sample E was found to have approximately doubled in volume and contained cells of a more uniform nature. The cured sample D containing the heat intumescing or expanding silicate of the present invention, however, yielded a greater than six-fold increase in volume and contained regular, evenly dispersed cells. Additionally, this highly expanding sample had a light straw color similar to the cured thermoset compound alone, without any blowing agent. The control E containing the azodicarbonamide, however, was found to have a dark orange/yellow color which would adversely affect the color of a finished part produced with these materials. Sample C was also found to be adversely affected by its blowing agent in that the cured resin appeared to be degraded and brittle.

EXAMPLE V

The blown and cured samples D and E of Example IV were subsequently coated with a fast drying spray enamel paint, and subjected to a temperature of 220° F. for a period of 30 minutes. Upon careful examination, the paint surface of sample E was found to contain numerous blisters and imperfections which were caused by the apparent post-blow of the azodicarbonamide in the sample. The painted surface of sample D, however, showed no such imperfections.

EXAMPLE VI

To the feed of an injection molding machine fitted with a test plaque mold and running polycarbonate resin at a temperature of 520° F. was added a mixture of polycarbonate pellets containing 0.5% of a silicate based blowing agent of the present invention. By injecting a volume of this material into the mold which was less than the actual volume of the mold, thereby allowing the subsequent expansion of the mixture to fill the mold, a lightweight test plaque was produced which weighed approximately 25% less than a similar plaque produced with polycarbonate resin alone.

While the present invention has been particularly described in terms of specific embodiments thereof, it will be understood in view of the instant teaching that numerous variations upon the invention are now enabled to those skilled in the art, which variations yet reside in the scope of the present invention. Accordingly, the invention is to be broadly construed and limited only by the scope and the spirit of the claims now appended hereto.

What is claimed is:

1. In the method for reducing by foaming the density of a thermally processed polymer by adding to the polymer prior to the thermal processing of same a blowing or foaming agent which generates gases during the said processing to foam said polymer; the improvement comprising: utilizing as said blowing or foaming agent an intumescing or expanding particulate alkali metal silicate which contains between 5 and 40% water, which water is released when the compounds are subjected during normal polymer thermal processing to a temperature greater than about 250° F. but below the degradation temperature of the polymer in which the particulate is contained; the silicate having a mole ratio of $SiO_2$: $M_2O$ of at least 1.5:1, where M represents an alkali metal or a combination of alkali metals.

2. A method in accordance with claim 1, in which the mean particle size of said particulate blowing agent is less than about 45 microns.

3. A method in accordance with claim 2, in which the mean particle size of said blowing agent is less than about 40 microns.

4. A method in accordance with claim 2, in which about 0.005 to 20 parts of the particulate blowing agent is added per 100 parts of polymer.

5. A method in accordance with claim 2, in which about 0.05 to 10 parts of the particulate blowing agent is added per 100 parts of the polymer.

6. The method of claim 1, wherein an organic blowing agent is also added to the polymer prior to said thermal processing; and wherein said alkali metal silicate acts as an initiator for said organic blowing agent, thereby allowing decreased use of the organic agent while still maintaining blowing performance.

7. A method in accordance with claim 6, wherein said organic blowing agent comprises an azodicarbonamide.

8. An intumescing or expanding particulate alkali metal silicate which contains between 5 and 40% water, which water is released when the compounds are subjected to said temperature greater than 250° F. but below the degradation temperature of the said polymer for use as a blowing or foaming agent additive with a polymer which is to be thermally processed at temperatures greater than about 250° F. but below the degradation temperature of the polymer; said silicate having a mole ratio of $SiO_2$:$M_2O$ of at least 1.5:1, where M represents an alkali metal or a combination of alkali metals.

9. A composition in accordance with claim 8, wherein the mean particle size of said particulate blowing agent is less than about 45 microns.

10. A composition in accordance with claim 9, wherein the mean particle size of said blowing agent is less than about 40 microns.

11. A composition in accordance with claim 8, further including an organic blowing agent for which the silicate acts as an initiator at said temperatures greater than 250° F.

12. A composition in accordance with claim 11, wherein said organic blowing agent comprises an azodicarbonamide.

* * * * *